US012682066B2

(12) United States Patent
Huang

(10) Patent No.: US 12,682,066 B2
(45) Date of Patent: Jul. 14, 2026

(54) METHOD OF SPEEDING UP SECURE BOOT PROCESS AND ELECTRONIC DEVICE USING THE SAME

(71) Applicant: Nuvoton Technology Corporation, Hsinchu (TW)

(72) Inventor: Wen-Hung Huang, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 267 days.

(21) Appl. No.: 18/334,332

(22) Filed: Jun. 13, 2023

(65) Prior Publication Data

US 2024/0070285 A1 Feb. 29, 2024

(30) Foreign Application Priority Data

Aug. 29, 2022 (TW) ................................. 111132414

(51) Int. Cl.
*G06F 21/57* (2013.01)

(52) U.S. Cl.
CPC ...... *G06F 21/575* (2013.01); *G06F 2221/034* (2013.01)

(58) Field of Classification Search
CPC ......................... G06F 21/575; G06F 2221/034
See application file for complete search history.

(56) References Cited

U.S. PATENT DOCUMENTS

| | | | |
|---|---|---|---|
| 6,263,431 B1 | 7/2001 | Lovelace et al. | |
| 11,042,383 B2 | 6/2021 | Lewis et al. | |
| 2013/0159690 A1* | 6/2013 | Tsukamoto | G06F 9/4401 713/2 |
| 2014/0129818 A1* | 5/2014 | Li | G06F 9/4403 713/2 |
| 2015/0220742 A1* | 8/2015 | Ouyang | G06F 9/4406 713/189 |
| 2016/0300064 A1* | 10/2016 | Stewart | G06F 12/0638 |
| 2020/0097658 A1* | 3/2020 | Samuel | G06F 11/0793 |
| 2022/0108016 A1* | 4/2022 | Nakata | H04L 9/3247 |
| 2022/0350891 A1* | 11/2022 | Bulmus | H04L 9/0897 |
| 2023/0143189 A1* | 5/2023 | Hong | H04L 9/3239 713/189 |
| 2023/0198775 A1* | 6/2023 | Liu | G06F 21/575 |
| 2024/0028733 A1* | 1/2024 | Munger | G06F 21/572 |
| 2024/0028735 A1* | 1/2024 | Savage | H04L 9/0891 |

FOREIGN PATENT DOCUMENTS

| | | |
|---|---|---|
| CN | 109997140 | 7/2019 |
| TW | 200401228 | 1/2004 |
| TW | I291127 | 12/2007 |
| TW | I617914 | 3/2018 |
| TW | 202115571 | 4/2021 |
| TW | 202145007 | 12/2021 |

* cited by examiner

*Primary Examiner* — Carl G Colin
*Assistant Examiner* — Zhe Liu
(74) *Attorney, Agent, or Firm* — JCIPRNET

(57) ABSTRACT

A method of speeding up a secure boot process and an electronic device using the method. The method includes the following. Whether a storage medium stores a pre-stored hash value corresponding to an image file for the secure boot process is determined. A hash value of the image file is calculated to determine whether the hash value matches the pre-stored hash value in response to the storage medium storing the pre-stored hash value. Firmware in the image file is executed to boot up the electronic device in response to the hash value matching the pre-stored hash value.

8 Claims, 3 Drawing Sheets

METHOD OF SPEEDING UP SECURE BOOT PROCESS AND ELECTRONIC DEVICE USING THE SAME

CROSS-REFERENCE TO RELATED APPLICATION

This application claims the priority benefit of Taiwanese application no. 111132414, filed on Aug. 29, 2022. The entirety of the above-mentioned patent application is hereby incorporated by reference herein and made a part of this specification.

BACKGROUND

Technical Field

The disclosure relates to a method of speeding up a secure boot process and an electronic device using the method.

Description of Related Art

In an electronic system required to be protected, operating system (OS) firmware to be executed is typically verified by a bootloader after the system is powered on to ensure security and integrity of the firmware. However, the verification takes an amount of time to be completed.

SUMMARY

Embodiments of the disclosure provide a method of speeding up a secure boot process and an electronic device using the method, in which verification of a firmware signature may be omitted to save the time spent on the secure boot process.

In an embodiment of the disclosure, an electronic device speeding up a secure boot process includes a storage medium and a processor. The storage medium stores a bootloader. The processor is coupled to the storage medium and accesses and executes the bootloader. The bootloader is configured to: determine whether the storage medium stores a pre-stored hash value corresponding to an image file for the secure boot process; calculate a hash value of the image file to determine whether the hash value matches the pre-stored hash value in response to the storage medium storing the pre-stored hash value; and execute firmware in the image file to boot up the electronic device in response to the hash value matching the pre-stored hash value.

In an embodiment of the disclosure, the bootloader is further configured to: verify the image file in response to the hash value not matching the pre-stored hash value; calculate the hash value of the image file in response to the image file passing verification; and store the hash value as the pre-stored hash value in the storage medium.

In an embodiment of the disclosure, the bootloader is further configured to: delete the pre-stored hash value from the storage medium in response to the hash value not matching the pre-stored hash value.

In an embodiment of the disclosure, the bootloader is further configured to: determine whether the secure boot process is initiated based on a cold reset command or a warm reset command in response to the hash value not matching the pre-stored hash value; and verify the image file in response to the secure boot process being initiated based on the cold reset command.

In an embodiment of the disclosure, the bootloader is further configured to: determine that the secure boot process fails in response to the secure boot process being initiated based on the warm reset command.

In an embodiment of the disclosure, the bootloader is further configured to: determine whether the secure boot process is initiated based on a cold reset command or a warm reset command in response to the storage medium not storing the pre-stored hash value; and verify the image file in response to the secure boot process being initiated based on the cold reset command.

In an embodiment of the disclosure, the bootloader is further configured to: determine that the secure boot process fails in response to the secure boot process being initiated based on the warm reset command.

In an embodiment of the disclosure, the bootloader is further configured to: verify a firmware public key in the image file; and determine whether the storage medium stores the pre-stored hash value in response to the firmware public key passing verification.

In an embodiment of the disclosure, a method of speeding up a secure boot process is applicable to an electronic device including a storage medium. The method includes the following. Whether the storage medium stores a pre-stored hash value corresponding to an image file for the secure boot process is determined. A hash value of the image file is calculated to determine whether the hash value matches the pre-stored hash value in response to the storage medium storing the pre-stored hash value. Firmware in the image file is executed to boot up the electronic device in response to the hash value matching the pre-stored hash value.

Based on the foregoing, the electronic device of the embodiments of the disclosure may pre-store the pre-stored hash value of the verified image file. When the electronic device requires to perform the secure boot process, the electronic device may determine whether the currently read image file is correct according to the pre-stored hash value. If the image file is correct, the electronic device may directly boot up the electronic device according to the image file instead of spending additional time verifying security and integrity of the image file.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
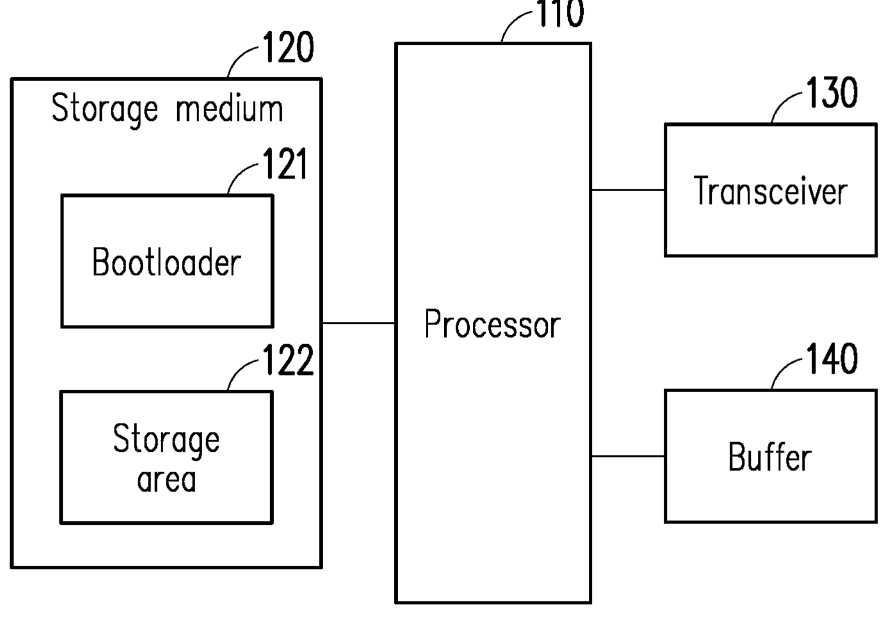
FIG. 1 is a schematic diagram of an electronic device speeding up a secure boot process according to an embodiment of the disclosure.

To facilitate comprehensibility of the disclosure, embodiments are provided below as an example accordingly to which the disclosure can be reliably implemented. In addition, wherever possible, elements/members/steps labeled with the same reference numerals in the drawings and embodiments refer to the same or similar parts.

FIG. 1 is a schematic diagram of an electronic device 100 speeding up a secure boot process according to an embodiment of the disclosure. The electronic device 100 may include a processor 110, a storage medium 120, a transceiver 130, and a buffer 140.

The processor 110 is, for example, a central processing unit (CPU), or any other programmable general-purpose or special-purpose micro control unit (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA), or other similar elements or a combination of the above elements. The processor 110 may be coupled to the storage medium 120, the transceiver 130, and the buffer 140, and may access and execute multiple modules and various applications stored in the storage medium 120 or in the buffer 140.

The storage medium 120 or the buffer 140 is, for example, any type of fixed or removable random access memory (RAM), read-only memory (ROM), flash memory, hard disk drive (HDD), solid state drive (SSD), or similar elements or a combination of the above elements, and is configured to store multiple modules, various applications, or an operating system executable by the processor 110. In this embodiment, the storage medium 120 may include a bootloader 121 and a storage area 122. The storage area 122 may be a non-volatile storage area. The storage area 122 may serve to store an image file or a pre-stored hash value corresponding to an image file. The pre-stored hash value is based on a secure hash algorithm (SHA), for example. The image file may include firmware (FW), a firmware public key (FW public key), a firmware hash value (FW hash value), a firmware signature (FW signature), and so on. The firmware hash value is based on SHA, for example.

The transceiver 130 transmits and receives signals wirelessly or by wire. The transceiver 130 may also perform operations such as low noise amplification, impedance matching, frequency mixing, frequency up-conversion or down-conversion, filtering, amplification, and the like. The electronic device 100 may communicate through the transceiver 130. For example, the electronic device 100 may be communicatively connected to a switch or a keyboard through the transceiver 130 to receive a cold reset command or a warm reset command from the switch or the keyboard.

Figure 2:
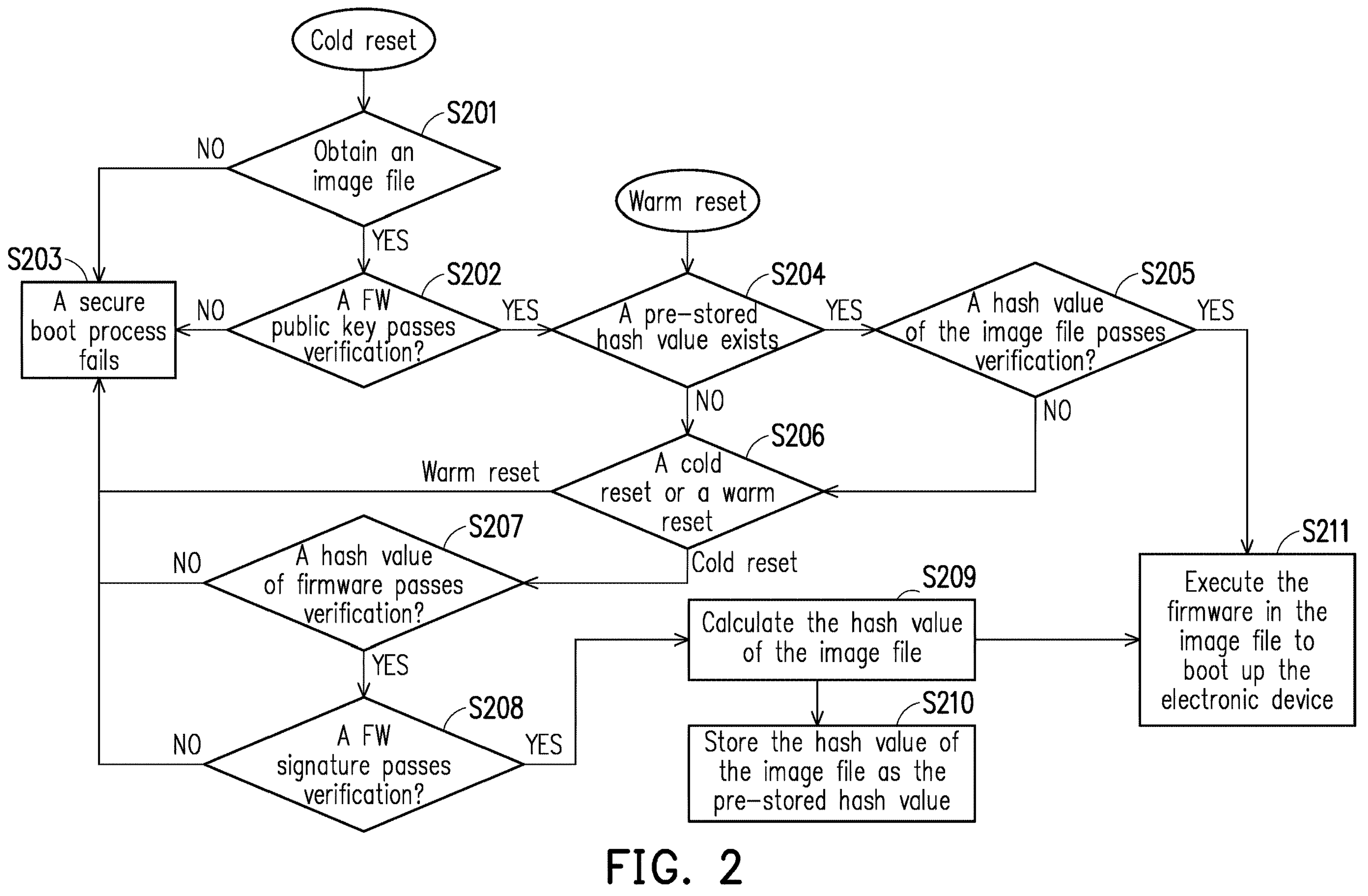
FIG. 2 is a flowchart of a secure boot process according to an embodiment of the disclosure.

FIG. 2 is a flowchart of a secure boot process according to an embodiment of the disclosure. The secure boot process may be implemented by the bootloader 121 in the electronic device 100 as shown in FIG. 1. The electronic device 100 may receive a booting command through the transceiver 130. If the electronic device 100 receives a cold reset command, the electronic device 100 may perform the secure boot process from step S201. If the electronic device 100 receives a warm reset command, the electronic device 100 may perform the secure boot process from step S204.

In step S201, the bootloader 121 may obtain an image file. The image file may be stored in the storage medium 120. If the bootloader 121 obtains the image file from the storage medium 120, the flow goes to step S202. The bootloader 121 may also load the image file into the buffer 140. If the bootloader 121 does not obtain the image file from the storage medium 120, the flow goes to step S203.

In step S202, the bootloader 121 may verify a FW public key in the image file, and determine whether the FW public key passes verification. If the FW public key passes verification, the flow goes to step S204. If the FW public key does not pass verification, the flow goes to step S203. Specifically, the bootloader 121 may obtain the FW public key in the image file from the buffer 140 and obtain a FW public key from an operating system or an application program executed by the electronic device 100. The bootloader 121 may determine whether the two FW public keys match. If the two FW public keys match, the bootloader 121 may determine that the FW public key in the image file passes verification. If the two FW public keys do not match, the bootloader 121 may determine that the FW public key in the image file does not pass verification.

In step S203, the bootloader 121 may determine that the secure boot process fails, and the bootloader 121 may cease the secure boot process. In an embodiment, the bootloader 121 may output an alert indicating failure of the secure boot process through transceiver 130. For example, the bootloader 121 may output an alert through the transceiver 130 to an output device such as a display or a buzzer to alert a user that the secure boot process has failed through the output device.

In step S204, the bootloader 121 may determine whether a pre-stored hash value corresponding to the image file (i.e., the image file in the buffer 140) for the secure boot process is stored in the storage area 122 of the storage medium 120. If the pre-stored hash value exists in the storage area 122, the flow goes to step S205. If the pre-stored hash value does not exist in the storage area 122, the flow goes to step S206.

In step S205, the bootloader 121 may calculate a hash value of the image file in the buffer 140, and determine whether the hash value of the image file passes verification. If the hash value of the image file passes verification, the flow goes to step S211. If the hash value of the image file does not pass verification, the flow goes to step S206. Specifically, the bootloader 121 may determine whether the hash value of the image file in the buffer 140 matches the pre-stored hash value in the storage area 122. If the hash value of the image file in the buffer 140 matches the pre-stored hash value in the storage area 122, the bootloader 121 may determine that the hash value of the image file passes verification. If the hash value of the image file in the buffer 140 does not match the pre-stored hash value in the storage area 122, the bootloader 121 may determine that the hash value of the image file does not pass verification.

In an embodiment, if the bootloader 121 determines that the hash value of the image file does not pass verification, the bootloader 121 may delete the pre-stored hash value from the storage area 120.

In step S206, the bootloader 121 may determine whether the secure boot process is initiated based on a cold reset command or a warm reset command. If the secure boot process is initiated based on the cold reset command, the flow goes to step S207, where the bootloader 121 may further verify the image file. If the secure boot process is initiated based on the warm reset command, the flow goes to step S203.

In step S207, the bootloader 121 may calculate a hash value of firmware in the image file, and verify whether the calculated hash value passes verification. If the hash value passes verification, the flow goes to step S208. If the hash value does not pass verification, the flow goes to step S203. Specifically, the bootloader 121 may obtain the firmware and a FW hash value from the image file in the buffer 140, and may further calculate a hash value of the obtained firmware. If the hash value calculated by the bootloader 121 matches the FW hash value, the bootloader 121 may determine that the hash value passes verification. If the hash value calculated by the bootloader 121 does not match the FW hash value, the bootloader 121 may determine that the hash value does not pass verification.

In step S208, the bootloader 121 may verify a FW signature. If the FW signature passes verification, the flow goes to step S209. If the FW signature does not pass verification, the flow goes to step S203. Verification of a FW signature takes an amount of time. For example, it takes a central processor at an operating frequency of 192 MHz about 130 milliseconds to perform signature verification based on the elliptic curve digital signature algorithm (ECDSA) of P-256. Therefore, if step S208 can be omitted, the secure boot process can be sped up.

In step S209, the bootloader 121 may calculate the hash value of the image file in the buffer 140. The hash value is based on SHA, for example.

In step S210, the bootloader 121 may store the calculated hash value of the image file as the pre-stored hash value in the storage area 122 of the storage medium 120.

In step S211, the bootloader 121 may execute the firmware in the image file to boot up the application program or the operating system of the electronic device 100.

After step S211, the electronic device 100 may execute the operating system or the application program. During execution of the operating system or the application program, if the bootloader 121 receives the cold reset command, the bootloader 121 may clear up the image file loaded into the buffer 140, and perform step S201. If the bootloader 121 receives the warm reset command, the bootloader 121 may not clear the image file loaded into the buffer 140, and perform step S204.

Figure 3:
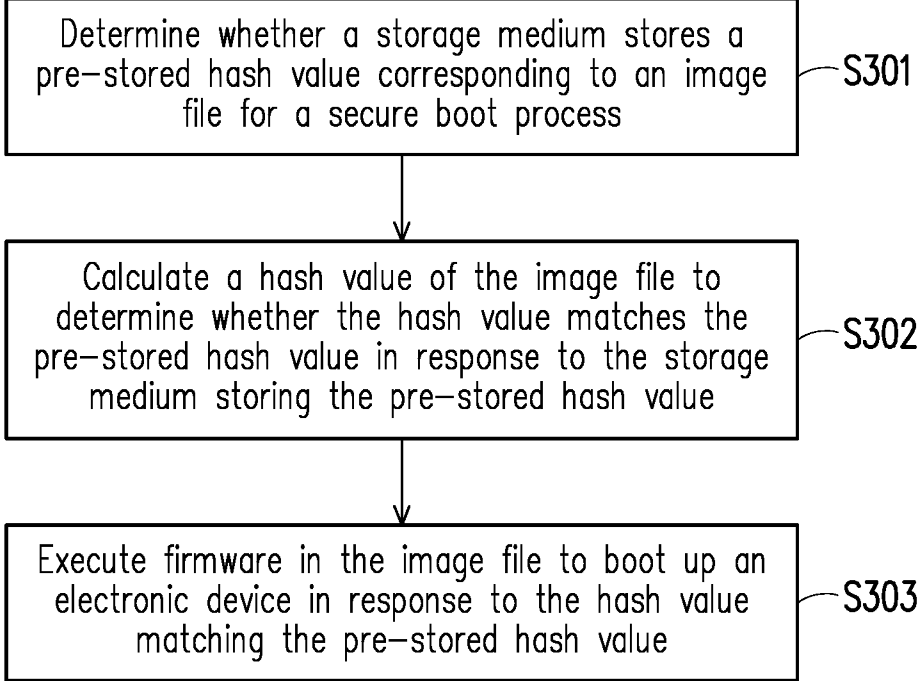
FIG. 3 is a flowchart of a method of speeding up a secure boot process according to an embodiment of the disclosure.

FIG. 3 is a flowchart of a method of speeding up a secure boot process according to an embodiment of the disclosure. The method may be implemented by the electronic device 100 as shown in FIG. 1. In step S301, whether a storage medium stores a pre-stored hash value corresponding to an image file for the secure boot process is determined. In step S302, a hash value of the image file is calculated to determine whether the hash value matches the pre-stored hash value in response to the storage medium storing the pre-stored hash value. In step S303, firmware in the image file is executed to boot up the electronic device in response to the hash value matching the pre-stored hash value.

In summary of the foregoing, the electronic device of the embodiments of the disclosure may pre-store the pre-stored hash value of the image file for the secure boot process. When the electronic device is to perform the secure boot process, the electronic device may determine whether the currently read image file matches the pre-stored hash value according to the pre-stored hash value. If they match, it indicates that the image file has not been changed. As such, the electronic device may omit steps such as verifying the FW signature and directly execute the firmware in the image file to complete the secure boot process in a relatively short time.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device speeding up a secure boot process, the electronic device comprising:

a storage medium storing a bootloader; and a processor coupled to the storage medium and accessing and executing the bootloader, wherein the bootloader is configured to:

determine whether the storage medium stores a pre-stored hash value corresponding to an image file for the secure boot process;

calculate a hash value of the image file to determine whether the image hash value matches the pre-stored hash value in response to the storage medium storing the pre-stored hash value; and execute firmware in the image file to boot up the electronic device in response to the image hash value matching the pre-stored hash value, wherein the bootloader is further configured to:

determine whether the secure boot process is initiated based on a cold reset command or a warm reset command in response to the image hash value not matching the pre-stored hash value;

obtain the firmware and a FW hash value from the image file in a buffer, and calculate a hash value of the firmware;

in response to the calculated firmware hash value matching the FW hash value, determine the calculated firmware hash value passes verification;

in response to the calculated firmware hash value not matching the FW hash value, determine the secure boot process fails, cease the secure boot process, and output an alert through a transceiver; and verify the image file in response to the secure boot process being initiated based on the cold reset command.

2. The electronic device of claim 1, wherein the bootloader is further configured to:

verify the image file in response to the image hash value not matching the pre-stored hash value;

calculate the hash value of the image file in response to the image file passing verification; and store the hash value calculated in response as the pre-stored hash value in the storage medium.

3. The electronic device of claim 1, wherein the bootloader is further configured to:

delete the pre-stored hash value from the storage medium in response to the image hash value not matching the pre-stored hash value.

4. The electronic device of claim 1, wherein the bootloader is further configured to:

determine that the secure boot process fails in response to the secure boot process being initiated based on the warm reset command.

5. The electronic device of claim 1, wherein the bootloader is further configured to:

determine whether the secure boot process is initiated based on the cold reset command or the warm reset command in response to the storage medium not storing the pre-stored hash value; and verify the image file in response to the secure boot process being initiated based on the cold reset command.

6. The electronic device of claim 5, wherein the bootloader is further configured to:

determine that the secure boot process fails in response to the secure boot process being initiated based on the warm reset command.

7. The electronic device of claim 1, wherein the bootloader is further configured to:

verify a firmware public key in the image file; and determine whether the storage medium stores the pre-stored hash value in response to the firmware public key passing verification.

8. A method of speeding up a secure boot process, the method being applicable to an electronic device comprising a storage medium, and the method comprising:

determining whether the storage medium stores a pre-stored hash value corresponding to an image file for the secure boot process;

calculating a hash value of the image file to determine whether the image hash value matches the pre-stored hash value in response to the storage medium storing the pre-stored hash value;

executing firmware in the image file to boot up the electronic device in response to the image hash value matching the pre-stored hash value;

determining whether the secure boot process is initiated based on a cold reset command or a warm reset command in response to the image hash value not matching the pre-stored hash value;

obtaining the firmware and a FW hash value from the image file in a buffer, and calculate a hash value of the firmware;

in response to the calculated firmware hash value matching the FW hash value, determine the calculated firmware hash value passes verification;

in response to the calculated firmware hash value not matching the FW hash value, determine the secure boot process fails, cease the secure boot process, and output an alert through a transceiver; and verifying the image file in response to the secure boot process being initiated based on the cold reset command.

* * * * *